US007634647B2

(12) United States Patent
Tanaka et al.

(10) Patent No.: US 7,634,647 B2
(45) Date of Patent: Dec. 15, 2009

(54) DATA STORAGE SYSTEM FOR SETTING OPERATION PARAMETER OF HOST SYSTEM ACCORDING TO OPERATING SYSTEM OF HOST SYSTEM

(75) Inventors: Eiichi Tanaka, Ninomiya (JP); Hidehiro Morita, Hadano (JP); Koichi Okada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 558 days.

(21) Appl. No.: 11/524,879

(22) Filed: Sep. 22, 2006

(65) Prior Publication Data

US 2008/0034196 A1  Feb. 7, 2008

(30) Foreign Application Priority Data

Aug. 7, 2006  (JP) ............................. 2006-215060

(51) Int. Cl.
G06F 15/177  (2006.01)
(52) U.S. Cl. ........................... 713/1; 713/100; 709/217; 709/229
(58) Field of Classification Search ...................... 713/1, 713/100; 709/217, 221, 229
See application file for complete search history.

(56) References Cited

U.S. PATENT DOCUMENTS 6,253,240 B1 * 6/2001 Axberg et al. ............... 709/223
6,839,815 B2 * 1/2005 Kagami et al. .............. 711/148
2002/0112043 A1 * 8/2002 Kagami et al. .............. 709/223
2002/0166033 A1 * 11/2002 Kagami et al. .............. 711/148
2004/0006572 A1   1/2004 Hoshino et al.

FOREIGN PATENT DOCUMENTS

JP  2003-303052  4/2002

\* cited by examiner

*Primary Examiner*—Chun Cao
(74) *Attorney, Agent, or Firm*—Stites & Harbison PLLC; Juan Carlos A. Marquez, Esq.

(57) ABSTRACT

Proposed are a storage system and a data management setting method capable of preventing the destruction of data while alleviating the management burden of system administrators and the like. This storage system has one or more host systems, and a storage control unit for providing a data logical volume configured from a storage extent for reading and writing data from and in each of the host systems. The storage control unit comprises a determination unit for determining the type of operation system loaded in the host system based on the type information of the operation system sent from the host system according to a command sent from the host system or a request of the storage control unit, and a parameter setting unit for setting a prescribed operation parameter of the host system according to the operation system determined with the determination unit.

8 Claims, 15 Drawing Sheets

FIG.3

| OS TYPE | VOLUME TYPE | SPECIFIED DATA | WAITING TIME |
|---|---|---|---|
| OS-A | Boot | cc DATA FROM ADDRESS aaaaa FOR bb BYTE | 5 |
| OS-A | Data | ff DATA FROM ADDRESS ddddd FOR ee BYTE | 4 |
| OS-B | Boot | ii DATA FROM ADDRESS ggggg FOR hh BYTE | 10 |
| OS-B | Data | ll DATA FROM ADDRESS jjjjj FOR kk BYTE | 9 |
| OS-C | Boot | oo DATA FROM ADDRESS mmmmm FOR nn BYTE AND OO DATA FROM ADDRESS MMMMM FOR NN BYTE | 3 |
| OS-C | Data | rr DATA FROM ADDRESS ppppp FOR qq BYTE | 2 |

| OS TYPE | HOST PARAMETER | | | |
|---|---|---|---|---|
| | MODE TYPE | SCSI COMMAND RESPONSE | MAXIMUM TRANSFER DATA LENGTH RESPONSE | UNIT SERIAL NUMBER RESPONSE | ... |
| UNKNOWN | COMMON MODE | VARIABLE | 1 Mbyte | SERIAL NUMBER | ... |
| OS-A | OS-A MODE | FIXED | 1 Mbyte | SERIAL NUMBER | ... |
| OS-B | OS-B MODE | VARIABLE | 512 Kbyte | SERIAL NUMBER | ... |
| OS-C | OS-C MODE | VARIABLE | 1 Mbyte | VOLUME NUMBER | ... |
| 621A | 621B | | | | 621G |
| | 621C | 621D | 621E | 621F | |

| VOLUME NUMBER (622A) | OS TYPE (622B) | VOLUME TYPE (622C) |
|---|---|---|
| 0 | OS-A | Data |
| 1 | OS-A | Data |
| 2 | OS-A | Data |
| 3 | OS-A | Data |
| 4 | OS-A | Data |
| 5 | UNFORMATTED | Data |
| 6 | OS-C | Data |
| 7 | OS-C | Data |
| 8 | UNKNOWN | Boot |

| HOST GROUP (623A) | ALLOCATED VOLUME NUMBER (623B) | HOST PARAMETER (623C) |
|---|---|---|
| A | 0, 1, 2 | OS-A MODE |
| B | 3, 4, 5 | OS-B MODE |
| C | 6, 7, 8 | COMMON MODE |

| HOST GROUP (623A) | ALLOCATED VOLUME NUMBER (623B) | HOST PARAMETER (623C) |
|---|---|---|
| A | 0, 1, 2 | UNDETERMINED |

| VOLUME NUMBER (622A) | OS TYPE (622B) | VOLUME TYPE (622C) |
|---|---|---|
| 0 | UNFORMATTED | Data |
| 1 | UNFORMATTED | Data |
| 2 | UNFORMATTED | Data |

| HOST GROUP (623A) | ALLOCATED VOLUME NUMBER (623B) | HOST PARAMETER (623C) |
|---|---|---|
| A | 0, 1, 2 | COMMON MODE |

623

VoL0 ff FROM ADDRESS dddd FOR ee BYTE

| VOLUME NUMBER | OS TYPE | VOLUME TYPE |
|---|---|---|
| 0 | OS-A | Data |
| 1 | UNFORMATTED | Data |
| 2 | UNFORMATTED | Data |

622A 622B 622C

622

| HOST GROUP | ALLOCATED VOLUME NUMBER | HOST PARAMETER |
|---|---|---|
| A | 0, 1, 2 | OS-A MODE |

DATA STORAGE SYSTEM FOR SETTING OPERATION PARAMETER OF HOST SYSTEM ACCORDING TO OPERATING SYSTEM OF HOST SYSTEM

CROSS-REFERENCES

The entire disclosure of Japanese Patent Application No. 2006-215060 filed on Aug. 7, 2006 including specification, claims, drawings and summary are incorporated herein by reference in its entirety.

BACKGROUND

The present invention generally relates to a storage system and a data management setting method, and in particular can be suitably applied to a storage system requiring the management setting with a host system for each storage apparatus when handling a plurality of storage apparatuses.

In recent years, pursuant to the advancement of information society, a storage system which handles extensive data manages data with a large-capacity storage apparatus provided separately from a host system.

This storage apparatus is configured by arranging a plurality of hard disk devices in an array, and, for instance, is configured based on RAID (Redundant Array of Independent Inexpensive Disks). In addition, at least one or more logical volumes (hereinafter referred to as "logical volumes") are formed on a physical storage extent provided by a plurality of hard disk devices. Large volumes of data from the host system are stored in the logical volumes.

Under this kind of situation, the management setting of the host system, storage apparatuses and peripheral equipment to be performed by a system administrator or the like is becoming complex.

In particular, when connecting the host system and the storage apparatus, the system administrator or the like needs to manually set the parameter setting (hereinafter referred to as the "host parameter setting") for the storage apparatus to identify the type of OS (Operating System) as basic software loaded in the host system so that the logical volume can operate in the host system.

Thus, Japanese Patent Laid-Open Publication No. 2003-303052 (Patent Document 1) discloses technology for automating this kind of host parameter setting to a certain degree. Although Patent Document 1 judges what kind of parameter is to be set by the system administrator or the like, the management system performs the host parameter setting according to human judgment. According to this technology, it is possible to reduce the operation management costs of the system administrator or the like.

SUMMARY

Nevertheless, upon introducing a storage apparatus, the system administrator needs to manually perform the host parameter setting and make judgments regarding such host parameter setting in addition to introduction procedures, and there is a problem that a setting error may occur.

Further, when a logical volume set for a certain OS is erroneously allocated to a host system set with a different OS, this will become an erroneous connection, and there is a problem in that the data to be stored is not stored and may be destroyed.

The present invention was devised in view of the foregoing points. Thus, an object of the present invention is to propose a storage system and a data management setting method capable of alleviating the management burden of system administrators or the like and capable of preventing the destruction of data.

In order to achieve the foregoing object, the present invention provides a storage system having one or more host systems, and a storage control unit for providing a data logical volume configured from a storage extent for reading and writing data from and in each of the host systems. The storage control unit comprises a determination unit for determining the type of operation system loaded in the host system based on the type information of the operation system sent from the host system according to a command sent from the host system or a request of the storage control unit, and a parameter setting unit for setting a prescribed operation parameter of the host system according to the operation system determined with the determination unit.

Thereby, the system administrator or the like needs to simply connect the host system and the storage apparatus in order for the storage apparatus to set a prescribed operation parameter of the host system in the storage apparatus.

The present invention further provides a data management setting method of a storage system having one or more host systems, and a storage control unit for providing a data logical volume configured from a storage extent for reading and writing data from and in each of the host systems. The storage control unit comprises a determination step for determining the type of operation system loaded in the host system based on the type information of the operation system sent from the host system according to a command sent from the host system or a request of the storage control unit, and a parameter setting step for setting a prescribed operation parameter of the host system according to the operation system determined at the determination step.

Thereby, the system administrator or the like needs to simply connect the host system and the storage apparatus in order for the storage apparatus to set a prescribed operation parameter of the host system in the storage apparatus.

According to the present invention, since the system administrator or the like is able to set the host parameter setting in the storage apparatus simply by connecting the host system and the storage apparatus, it is possible to reliably avoid a setting error and alleviate the management burden of system administrators or the like.

Further, the system administrator or the like will be able to easily connect the host system and the storage apparatus, and prevent the destruction of data due to an erroneous connection.

DESCRIPTION OF DRAWINGS

FIG. 3 is a conceptual diagram showing a verification table according to an embodiment of the present invention;

FIG. 4 is a conceptual diagram showing a host parameter table according to an embodiment of the present invention;

FIG. 5 is a conceptual diagram showing a volume table according to an embodiment of the present invention;

FIG. 6 is a conceptual diagram showing a host group table according to an embodiment of the present invention;

FIG. 8 is a conceptual diagram showing a host group table before connection to a host system according to an embodiment of the present invention;

FIG. 9 is a conceptual diagram showing a volume table before connection to a host system according to an embodiment of the present invention;

FIG. 10 is a conceptual diagram showing a host group table before connection to a host system according to an embodiment of the present invention;

DETAILED DESCRIPTION

An embodiment of the present invention is now explained in detail with reference to the attached drawings.

(1) First Embodiment

(1-1) Configuration of Storage System in First Embodiment

The storage system according to the first embodiment is now explained.

Figure 1:
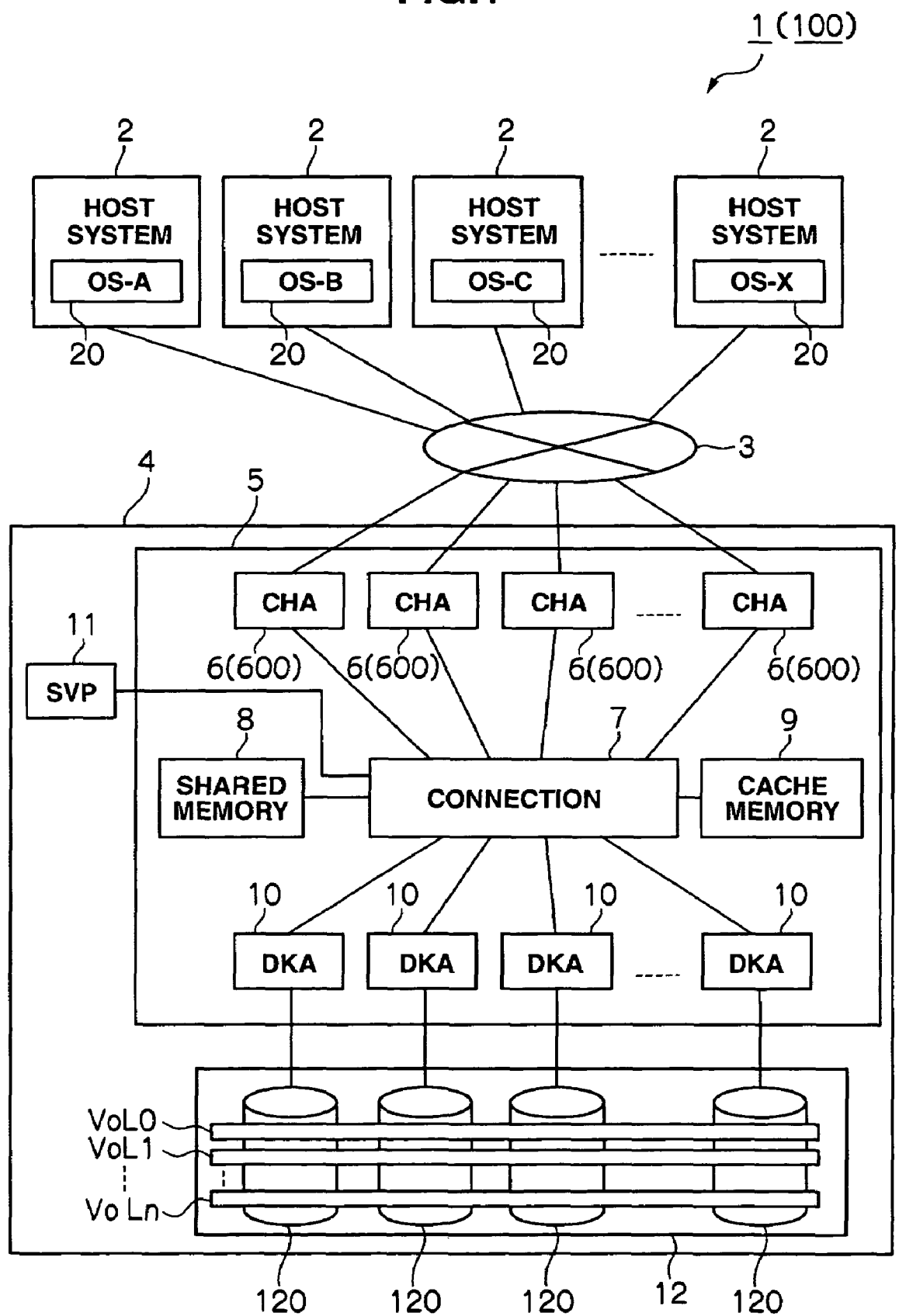
FIG. 1 is a block diagram showing the overall configuration of a storage system according to an embodiment of the present invention.

FIG. 1 shows the overall storage system 1 according to the first embodiment of this invention. The storage system 1 is configured by one or more host systems 2 being connected to a storage apparatus 4 via a network 3.

The host system 2 is a computer system comprising information processing resources such as a CPU (Central Processing Unit), a memory and the like, and, for instance, is configured from a personal computer, a workstation, a mainframe or the like. Further, the host system 2 comprises an information input device (not shown) such as a keyboard, a switch, a pointing device or a microphone, and an information output device (not shown) such as a monitor display or a speaker. An OS 20 to be loaded in the host system is set in each host system 2.

The OS 20 is software for providing programs to be used by the system administrator or the like for operating the host system to perform file management, memory management and I/O management.

The network 3 is configured from a SAN (Storage Area Network), LAN (Local Area Network), internet, public line, dedicated line or the like. Communication between the host system and the storage apparatus via the network is conducted, for example, according to a fibre channel protocol when the network 3 is a SAN, and conducted, for example, according to a TCP/IP (Transmission Control Protocol/Internet Protocol) protocol when the network 3 is a LAN.

The storage apparatus 4 comprises a controller 5 for managing the hard disk drives 120 according to a RAID system, a service processor 11, and a disk drive unit 12 configured from a plurality of hard disk drives 120.

The controller 5 comprises a plurality of channel adapters 6, a connection 7, a shared memory 8, a cache memory 9 and a plurality of disk adapters 10.

Each channel adapter 6 is configured as a microcomputer system comprising a CPU 60, a memory 61, a communication interface and the like, and comprises ports 64, 65 to be connected to the network and the connection. The channel adapter 6 interprets the various commands sent from the host system 2, and executes necessary processing. A network address (for instance, IP address or WWN) is allocated to the ports 64, 65 of the respective channel adapters 6 for identifying such ports, and each of the channel adapters 6 can thereby independently act as a NAS (Network Attached Storage). Various management table groups 62 and various control programs 63 described later are also stored in the channel adapter 6.

In addition to being connected to the channel adapters 6, the connection 7 is also connected to the shared memory 8, the cache memory 9 and the disk adapter 10. The transfer of data and commands among the channel adapters 6, the shared memory 8, the cache memory 9 and the disk adapters 10 is conducted via the connection 7. The connection 7, for example, is configured from a switch such as an ultra fast crossbar switch or a bus that performs data transfer by way of high-speed switching.

The shared memory 8 is a storage memory to be shared by the channel adapters 6 and the disk adapters 10. The shared memory 8 is primarily used for storing the system configuration information and various control programs read from the system volume upon turning on the power of the storage apparatus 4, and commands from the host system 2.

The cache memory 9 is also a storage memory to be shared by the channel adapters 6 and the disk adapters 10. The cache memory 9 is primarily used for temporarily storing user data to be input to and output from the storage apparatus 4.

Each disk adapter 10 is configured as a microcomputer system comprising a microprocessor, a memory and the like, and functions as an interface that performs protocol control during communication with the respective hard disk drives 120. These disk adapters 10 are connected to the corresponding hard disk drives 120, for instance, via a fibre channel cable, and send and receive data to and from the hard disk drives 120 according to a fibre channel protocol.

The service processor 11 is a computer device to be operated for the maintenance or management of the storage apparatus 4, and, for example, is configured from a laptop personal computer. The service processor 11 is connected to the host system 2 via a network, and is capable of receiving data or commands from the host system 2. The service processor 11 is able to monitor and display the occurrence of a failure in the storage apparatus 4 on a display screen (not shown).

The disk drive unit 12, for instance, is configured from an expensive hard disk drive such as a SCSI (Small Computer System Interface) disk or an inexpensive hard disk drive such as a SATA (Serial AT Attachment) disk. In this embodiment, the hard disk drives 120 are configured from expensive SCSI (Small Computer System Interface) disks.

One or more logical volumes VOL0 to VOLn are defined on the storage extent provided by the respective hard disk drives 120. Data from the host system 2 is read from and written into the logical volumes VOL0 to VOLn in block units of a prescribed size.

A unique identifier (LUN: Logical Unit Number) is allocated to the respective logical volumes VOL0 to VOLn. In this embodiment, the input and output of user data is conducted by combining the identifier and a unique number (LBA: Logical Block Address) of the block allocated to the respective blocks as an address, and designating such address.

When the storage system 1 configured as described above receives a data write request from the host system 2, data is temporarily stored in the cache memory 9 via the channel adapter 6. In addition, when the microprocessor of the disk adapter 10 recognizes information via the shared memory 8 indicating that data has been written in the cache memory 9, it acquires data from the cache memory 9, and writes data in the hard disk drive 120 of the disk device unit 12. Incidentally, when reading data, data is read according to a flow that is opposite to the flow described above.

(1-2) Host Parameter Setting Function

The host parameter setting function loaded in the storage system 1 in this embodiment is now explained.

When connecting the host system 2 to the storage apparatus 4, the storage system 1 is characterized in that the storage apparatus 4 determines the type of OS (hereinafter referred to as the "OS type") loaded in the host system 2, and the storage apparatus 4 sets the operation parameter of the host system 2 in the storage apparatus 4 according to the OS type. The specific configuration of the storage apparatus 4 for realizing the foregoing characteristic is now explained.

Figure 2:
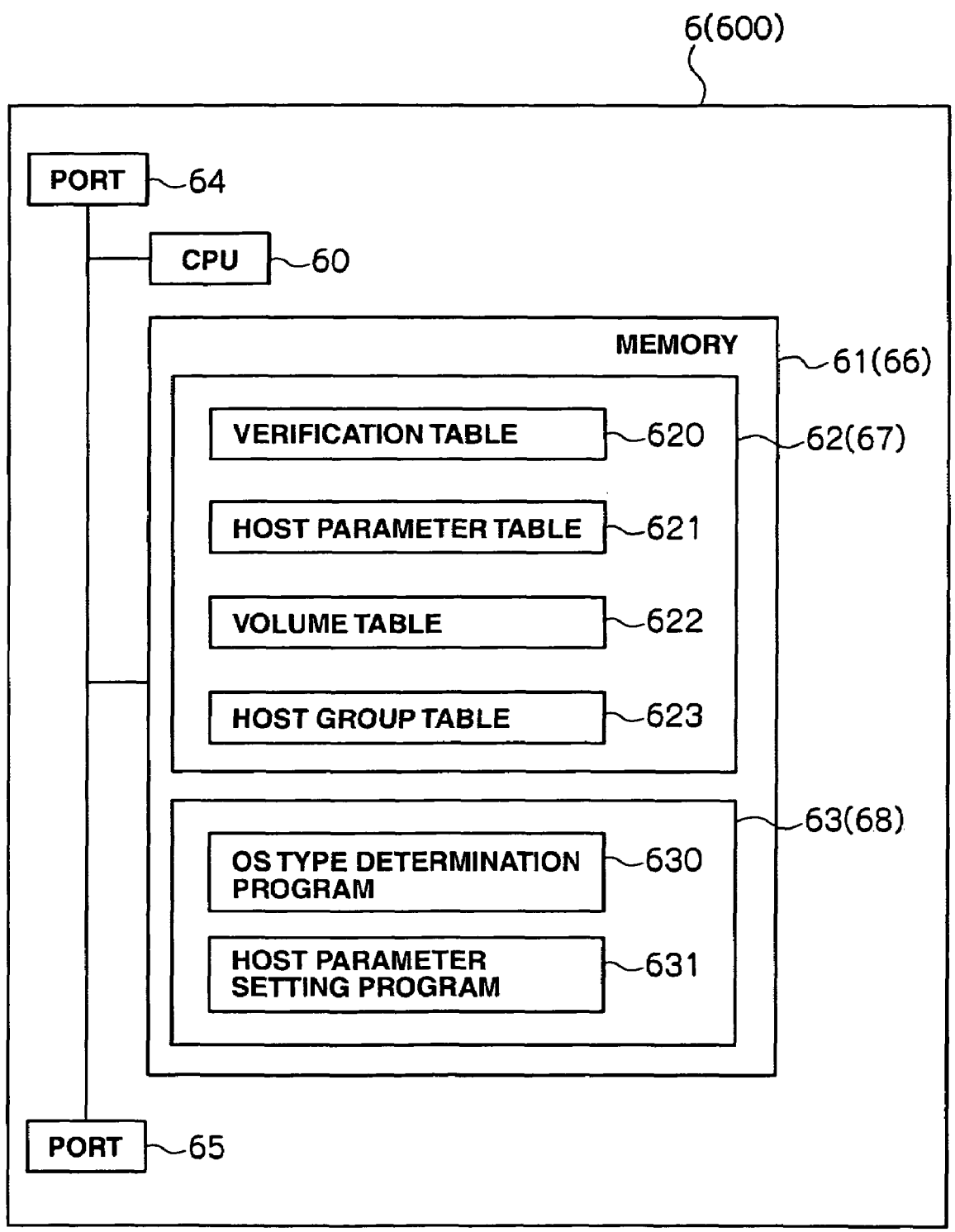
FIG. 2 is a block diagram showing the internal configuration of a channel adapter according to an embodiment of the present invention.

FIG. 2 shows the specific configuration of a channel adapter of the storage apparatus 4. As shown in FIG. 2, the channel adapter 6 comprises a CPU 60 and a memory 61.

The CPU 60 is a processor for governing the operation control of the overall storage apparatus, and executes various processing according to the control programs stored in the memory 61. Further, the memory 61, for instance, is used as a work area of the CPU 60, and stores a management table group 62 and a control program 63.

The management table group 62 is configured from a verification table 620, a host parameter table 621, a volume table 622 and a host group table 623.

The verification table 620 is a table for verifying data written in the hard disk drive 120 from the host system 2 loaded with a certain OS, against sample data stored beforehand in the memory 61. Here, sample data refers to data specifically showing the characteristics of data set forth in accordance with the OS type or volume type described later. The verification table 620 is stored as a table that is pre-stored in the memory 61. As shown in FIG. 3, the verification table 620 comprises an "OS type" field 620A, a "volume type" field 620B, a "specified data" field 620C and a "waiting time" field 620D.

Among the above, the "OS type" field 620A stores the name of the OS set in the host system 2.

Further, the "volume type" field 620B stores the type of logical volumes VOL0 to VOLn. Specifically, the "volume type" field 620B stores a boot volume and a data volume. A boot volume is a logical volume storing the OS of the host system 2, and is a so-called bootable logical volume in which the host system is activated by reading the boot volume from the host system 2. A data volume is a logical volume storing data to be read from and written into the host system 2.

Further, the "specified data" field 620C stores sample data for identifying and specifying the OS type. The "specified data" field 620C is a field for determining the OS type by identifying the data from the host system 2 stored in the logical volumes VOL0 to VOLn. For example, specified data of "ff data starting from the address dddd for ee byte" represents that this is a data sequence ff with a data length of ee bytes from the top address dddd.

Further, the "waiting time" field 620D stores the time required for the CPU 60 to determine that the data written from the host system 2 is the foregoing specified data. For example, in the case of specified data of "ff data from address dddd for ee byte", this shows that 4 seconds were required for the CPU 60 to determine that this is specified data.

The host parameter table 621 is a table for operating as a logical volume appropriate as the OS type loaded in the host system. The host parameter table 621 is stored as a table pre-stored in the memory 61. As shown in FIG. 4, the host parameter table 621 is configured from an "OS type" field 621A and a "host parameter" field 621B.

The "OS type" field 621A, as with the verification table 620 described above, stores the name of the OS loaded in the host system 2. Incidentally, the OS type that is not stored beforehand in the verification table 620 is considered unknown.

The "host parameter" field 621B stores a parameter for the storage apparatus 4 to identify and determine the OS type. In other words, the "host parameter" field 621B stores a parameter for providing a unique response between the host system 2 and the storage apparatus 4 in correspondence with each OS type. As a result of the CPU 60 of the storage apparatus 4 identifying this parameter, it is able to operate as a logical volume appropriate for the OS type loaded in the host system 2. Further, the "host parameter" field 621B configures a "mode type" field 621C.

The "mode type" field 621C stores the name of the mode corresponding to the OS type for the storage apparatus 4 to identify the OS type. The "mode type" field 621C is further configured from a "SCSI command response" field 621D, a "maximum transfer data length response" field 621E, a "unit serial number response" field 621F and so on.

The "SCSI command response" field 621D stores a command response appropriate for the OS type in a case when a SCSI-based command is issued from the host system 2 for the storage apparatus 4 that received such command to respond to the host system 2. Specifically, the "SCSI command response" field 621D stores the mode of reply; namely, "variable" of changing the ID of notifying the version program of the control program 63 of the storage apparatus 4 to the host system 2, or "fixed" of responding without making any change.

The "maximum transfer data length response" field 621E stores the maximum data length for returning to the host system 2 the data received by the storage apparatus 4.

The "unit serial number response" field 621F stores the number of the case of the storage apparatus 4 or the logical volumes VOL0 to VOLn. The host system 2 requests the serial number of the case or the logical volume number depending on the set OS type.

For instance, when the OS type is "OS-A", the host system 2 receives a response as the "OS-A mode", and sets the parameter. Specifically, the host parameter of "fixed" as the SCSI command, "1M byte" as the maximum transfer data length, and "serial number" of the case as the unit serial number is provided as the response to the host system 2. When the OS type is "unknown", although it is not the optimal mode, a "common mode" compatible with all OS types is set.

Incidentally, in addition to the foregoing fields, the "host parameter" field 621B may also be configured from another field 621G as needed if it is a parameter that is necessary for the storage apparatus 4 to recognize the OS type.

The volume table 622 is a table for managing the status of all logical volumes VOL0 to VOLn provided on the storage extent of the hard disk drive 120 of the storage apparatus 4. As shown in FIG. 5, the volume table 622 is configured from a "volume number" field 622A, an "OS type" field 622B and a "volume type" field 622C.

The "volume number" field 622A stores the number of all logical volumes VOL0 to VOLn provided on the storage extent of the hard disk drive 120 of the storage apparatus 4.

The "OS type" field 622B and the "volume type" field 622C store the same information as the verification table 620 described above, and the explanation thereof is omitted.

For instance, the example shown in FIG. 5 shows that the logical volume VOL0 having the number "0" is being used as the "Data" volume of "OS-A". Further, the example shows that the logical volume VOL5 having the number "5" is "unformatted" and has not been formatted for a specified OS, and is being used as the "Data" volume. Moreover, the example shows that the logical volume VOL8 having the number "8" is being used as an "unknown" "Boot" volume that does not correspond to an OS type of the verification table 620.

Incidentally, the logical volumes VOL0 to VOLn allocated in the case of "unknown" that does not correspond to any OS type of the verification table 620 are set as a "Boot" volume. This is in order to reliably boot the host system 2 and the storage apparatus 4 in which an unknown OS type is set, and to ensure the accuracy in determining the OS type described later.

The host group table 623 is a table for managing the logical volumes VOL0 to VOLn allocated to the host system 2 group to be connected to the storage apparatus 4, and information concerning the host parameter. As shown in FIG. 6, the host group table 623 is configured from a "host group" field 623A, an "allocated volume number" field 623B and a "host parameter" field 623C.

The "host group" field 623A stores the name of the host system 2 group to be connected to the storage apparatus 4. For the sake of convenience in explanation, the name of one host system 2 is stored.

The "allocated volume number" field 623B stores the number of the logical volumes VOL0 to VOLn to be allocated to the host group.

The "host parameter" field 623C is the same as the "host parameter" field 621B of the host parameter table 621 described above, and the explanation thereof is omitted.

For instance, in the case of FIG. 6, logical volumes VOL0, VOL1, VOL2 having the numbers "0", "1" and "2" are allocated to the host group "A". When referring to the volume table 622 shown in FIG. 5, since the OS type of the logical volumes VOL0, VOL1, VOL having the numbers "0", "1" and "2" is all "OS-A", the "OS-A mode" is stored in the "host parameter" field 623C.

Further, the logical volumes VOL3, VOL4, VOL5 having the numbers "3", "4" and "5" are allocated in the host group "B". When referring to the volume table 622 shown in FIG. 5, the OS type of the logical volumes VOL3, VOL4 having the numbers "3" and "4" is "OS-B", and the OS type of the logical volume VOL5 having the number "5" "unformatted". Thus, the "OS-B mode" is stored in the "host parameter" field 623C.

Moreover, the logical volumes VOL6, VOL7, VOL8 having the numbers "6", "7" and "8" are allocated to the host group "C". When referring to the volume table 622 shown in FIG. 5, the OS type of the logical volumes VOL6, VOL7 having the numbers "6" and "7" is "OS-C", but the OS type of the logical volume VOL8 having the number "8" is "unknown". Thus, the "common mode" compatible with all OS types is stored in the "host parameter" field 623C in order to prevent any malfunctions from occurring between the host system 2 and the storage apparatus 4.

(1-3) Processing Contents of CPU of Storage Apparatus Concerning Host Parameter Setting Function The processing contents of the CPU 60 of the storage apparatus 4 concerning the host parameter setting function are now explained. Specifically, during the sequential operation routine for the period from before to after the connection of the host system 2 and the storage apparatus 4, the processing contents up to when the host parameter is set in the storage apparatus 4 is now explained.

(1-3-1) Processing Contents before Connection of Host System

Figure 7:
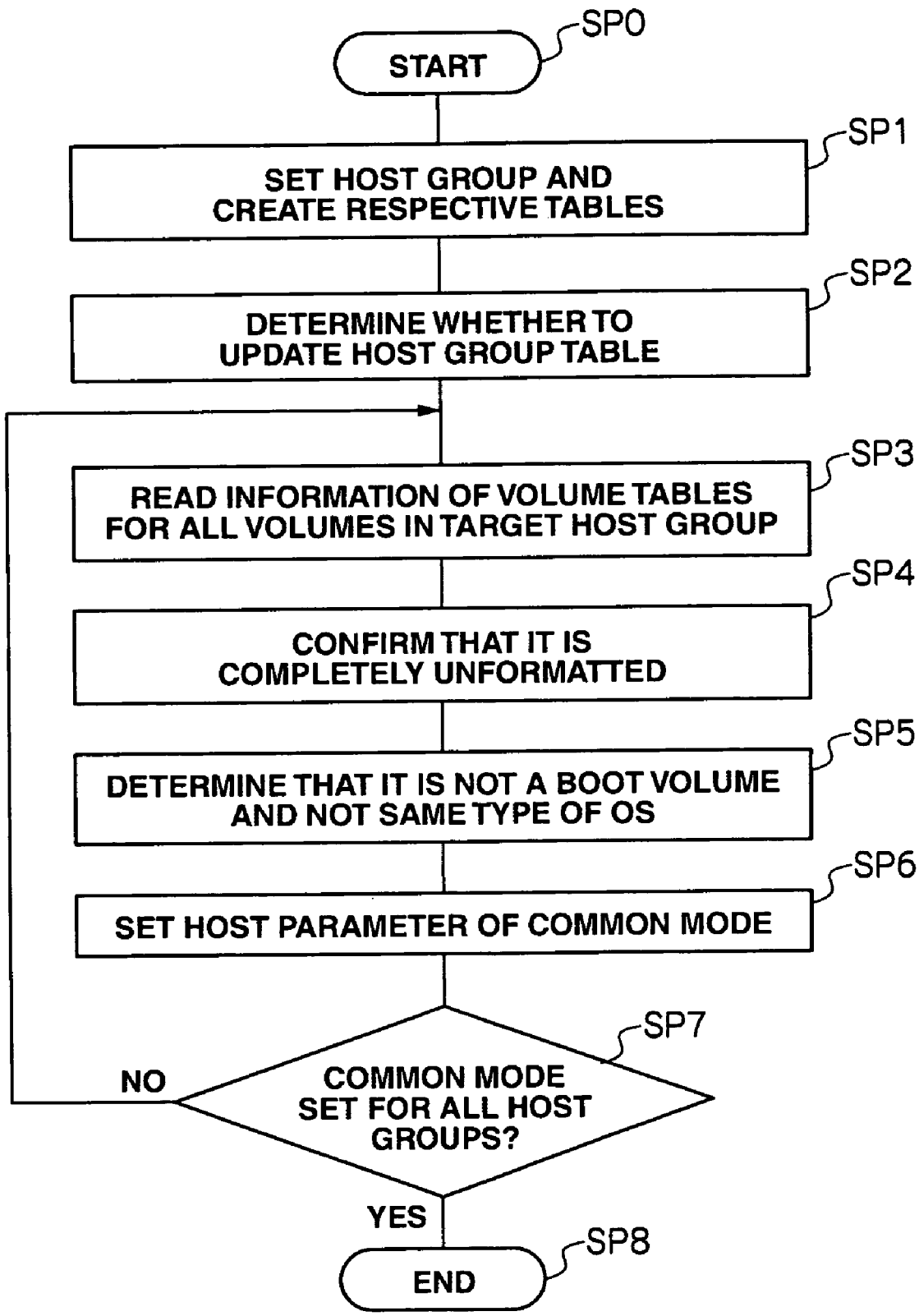
FIG. 7 is a flowchart of the setting of a storage apparatus before connection to a host system according to an embodiment of the present invention.

FIG. 7 is a flowchart showing the contents of the initial setting processing to be performed by the CPU 60 before the host system 2 is connected to the storage apparatus 4. Here, the CPU 60 executes the host parameter setting processing before connection of the host system 2 and creates a primary host parameter in the host group table 623 based on the host parameter setting program 631 stored in the memory 61 of the storage apparatus 4.

In other words, the CPU 60 starts the initial setting processing according to prescribed user operations after the introduction of the storage apparatus 4 (SP0), and foremost respectively creates the host group table 623 shown in FIG. 8 and the volume table 622 for each host group shown in FIG. 9 according to the setting of the host group performed by the user (setting of the host system belonging to the host group) and the setting of allocation of the logical volumes to the respective host groups (SP1). Here, the "host parameter" field 623C of the host group table 623 shown in FIG. 8 is "undetermined".

Subsequently, the CPU 60 determines whether to update the host group table 623 (SP2). Thereby, the CPU 60 determines that the processing is for newly creating the host group table 623.

Subsequently, the CPU 60 selects one host group from the host groups registered in the host group table, and reads the information registered in the volume table 622 corresponding to the host group (SP3). Incidentally, at this stage, as shown in FIG. 9, the respective logical volumes are set as "unformatted" "Data" logical volumes in the volume table 622.

When the CPU 60 confirms that the "OS type" field 622B is all "unformatted" based on the information read from the volume table 622 (SP4), it subsequently determines whether the "volume type" field 622C has a "Boot" logical volume, and whether it is the same type of OS (SP5).

When the "OS type" field 622B is in an "unformatted" state, the CPU 60 temporarily sets the "common mode" in the "host parameter" field 623C of the host group table 62 shown in FIG. 10 (SP6), and thereafter determines whether the same setting has been performed to all host groups registered in the host group table (SP7).

The CPU 60 returns to step SP3 upon obtaining a negative result in this determination (SP7: NO). Contrarily, when it obtains a positive result (SP7: YES), the CPU 60 ends the sequential operational processing relating to the host parameter function during the introduction of the storage apparatus 4 (SP8).

(1-3-2) Processing Contents after Connection of Host System

Figure 11:
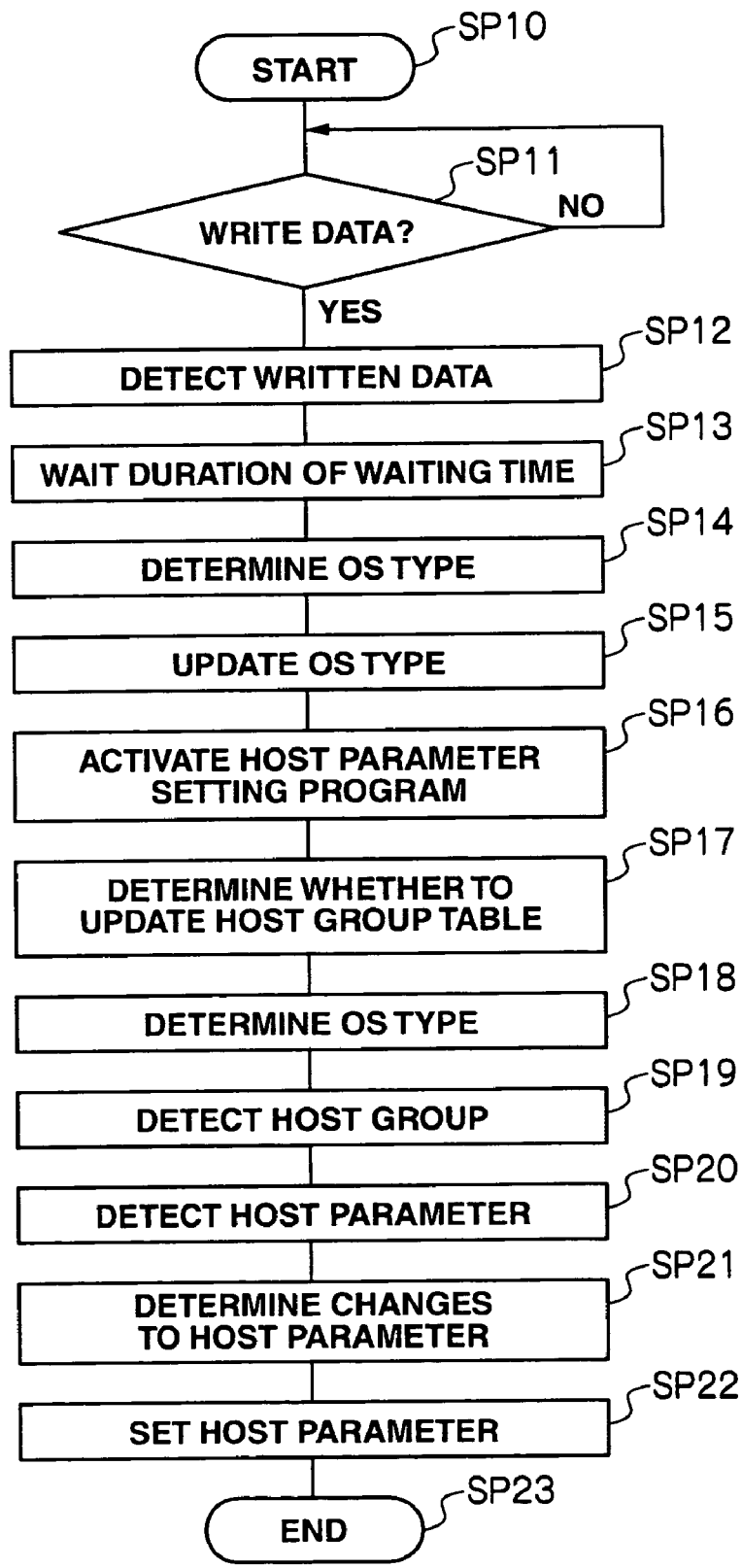
FIG. 11 is a flowchart of the setting of a storage apparatus before connection to a host system according to an embodiment of the present invention.

FIG. 11 is a flowchart showing the processing contents of the CPU 60 after connecting the host system 2 to the storage apparatus 4. Here, the CPU 60 executes the OS type determination processing and the host parameter setting processing after connection of the host system 2 and sets the host parameter in the host group table 623 based on the OS type determination program 630 and the host parameter setting program 631 stored in the memory 61 of the storage apparatus 4.

After connecting to the host system 2, when formatting the logical volumes VOL0 to VOLn connected to the host system 2, the CPU 60 starts the sequential operational processing relating to the host parameter function (SP10). For instance, a case is explained of formatting the logical volume VOL0 having the number "0" connected to the host system 2 that is set as OS-A.

Subsequently, the CPU 60 activates the OS type determination program 630 and waits for data to be written from the host system 2. When the CPU 60 receives the write request of data from the host system 2, it determines whether it is writing of data from the host system 2 (SP11).

When the CPU 60 determines that it is not writing of data from the host system 2 (SP11: NO), it returns to the state of waiting for the writing of data from the host system 2.

Figures 12, 13, 14:
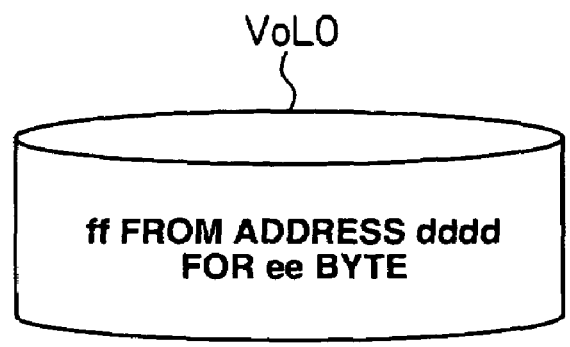
FIG. 12 is a conceptual diagram of a logical volume written with specified data according to an embodiment of the present invention.
FIG. 13 is a conceptual diagram showing volume table after connection to a host system according to an embodiment of the present invention.
FIG. 14 is a conceptual diagram showing a host group table after connection to a host system according to an embodiment of the present invention.

Meanwhile, when the CPU 60 determines that it is writing of data from the host system 2 (SP11: YES), it detects the data to be written in the logical volumes VOL0 to VOLn (SP12). For instance, the CPU 60 detects the data to be written in the logical volume VOL0 as shown in FIG. 12.

Then the CPU 60 refers to the verification table 620 shown in FIG. 3 while the data is being written from the host system 2 to the logical volume VOL0, verifies the written data against the specified data, and waits for the determination of the OS type for the duration of the waiting time corresponding to the specified data when the written data is the specified data (SP13). For example, in the case of the data shown in FIG. 12, the CPU 60 refers to the verification table 620 and is given a waiting time of 5 seconds.

The CPU 60 subsequently verifies the data written in the logical volume VOL0 against the sample data stored beforehand in the verification table 620 (SP14). For instance, in the case of the data shown in FIG. 12, the CPU 60 refers to the verification table 620 and determines that it is specified data of "OS-A".

Subsequently, the CPU 60 updates the "OS type" field 622B corresponding to the "logical volume number" field 622A storing specified data in the volume table 622 (SP15). For example, in the case of the data shown in FIG. 12, the CPU 60 changes the "OS type" field 622B corresponding to the logical volume VOL0 having the number "0" in the volume table 622 from "unformatted" to "OS-A", and updates the "OS type" field 622B to "OS-A" as shown in FIG. 13.

Since the CPU 60 determined that the information in the volume table 622 has been updated, it activates the host parameter setting program 631 (SP16), and determines whether the host parameter table 623 has been updated (SP17).

Further, the CPU 60 detects the OS type corresponding to the logical volume updated by referring to the volume table 622 (SP18). For example, in the case of the data shown in FIG. 12, the CPU 60 detects an OS type referred to as OS-A".

Subsequently, the CPU 60 refers to the host group table 623, and detects the host group to which the logical volume VOL0 with the updated OS type belongs (SP19). For instance, in the case of the specified data shown in FIG. 12, the CPU 60 detects this to be host group "A" as shown in FIG. 10.

Subsequently, the CPU 60 refers to the host parameter table 623, and detects the host parameter corresponding to the detected. OS type (SP20). For instance, in the case of the data shown in FIG. 12, since the OS type is "OS-A", the CPU 60 detects the "OS-A mode" from the "mode type" field 621C of the host parameter table 621 as shown in FIG. 4.

Subsequently, the CPU 60 determines that the host parameter of the host group table 623 has been changed (SP21), and sets the host parameter corresponding to the host group of the host group table 623 (SP22). For instance, in the case of the data shown in FIG. 12, the CPU 60 detects the "OS-A mode" as the host parameter. Then the CPU 60 changes the "common mode" set in the "host parameter" field 623C of the host group table 623 to the "OS-A mode" as shown in FIG. 14.

Like this, when the CPU 60 ultimately decides the host parameter regarding the specified data written from the host system 2 to the logical volume VOL0, it ends the sequential operational processing concerning the host parameter function (SP23).

(1-3-3) Specific Processing Contents of Control Program

As described above, a case was explained regarding the sequential operational processing relating to the host parameter function from before to after the CPU 60 connecting the storage apparatus 4 to the host system 2. Here, the specific processing contents of the control program 63 that became required in the sequential operational processing are now explained.

(1-3-3-1) OS Type Determination Processing

Foremost, the processing routine of the CPU 60 upon determining the OS type of the specified data written in the logical volumes VOL0 to VOLn is explained.

Figure 15:
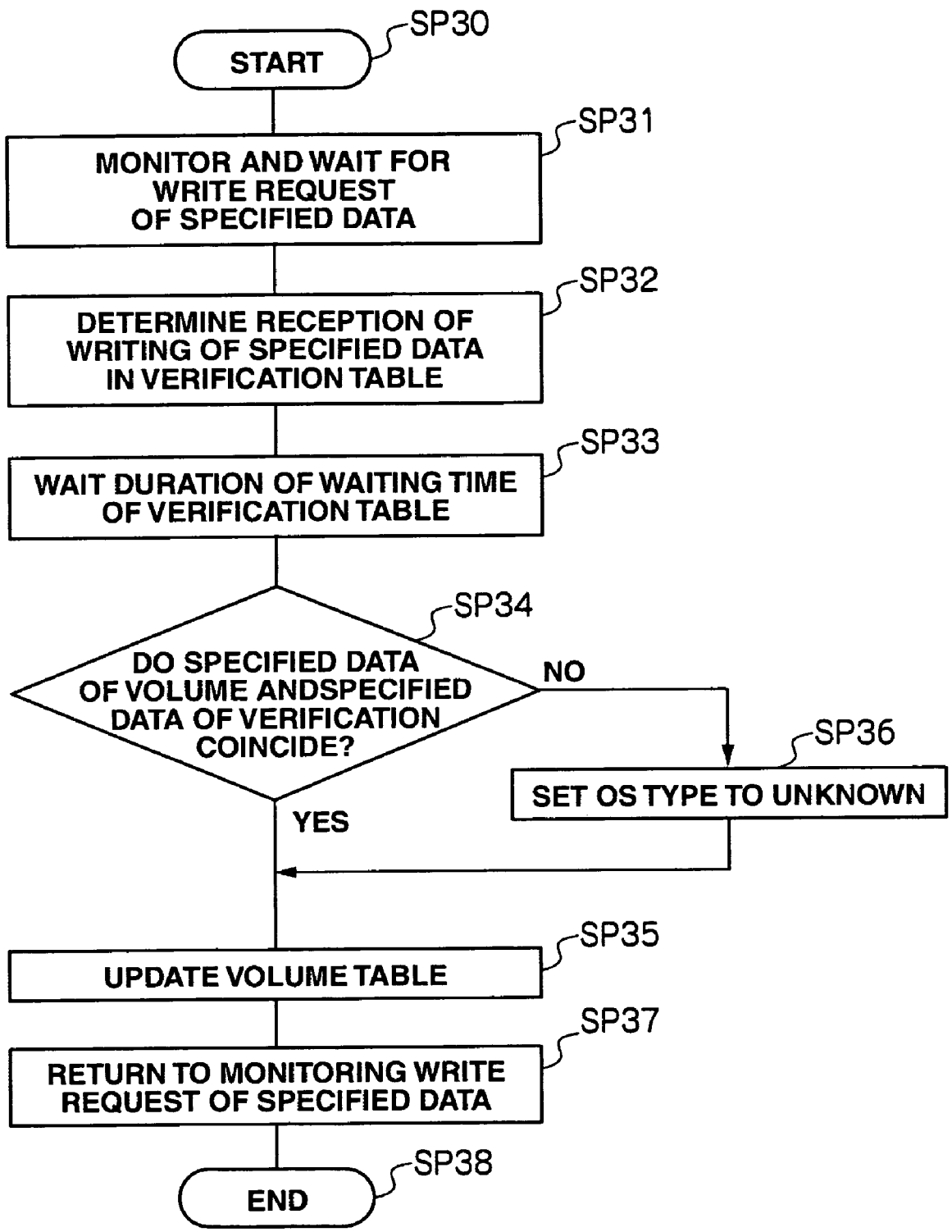
FIG. 15 is a flowchart of the OS type determination processing according to an embodiment of the present invention.

FIG. 15 is a flowchart showing the processing contents of the CPU 60 concerning the OS type determination processing. In this processing, the CPU 60 executes the OS type determination processing based on the OS type determination program 630 stored in the memory 61, and determines the OS type of the specified data written in the logical volumes VOL0 to VOLn.

In other words, the CPU 60 starts the OS type determination processing upon constantly monitoring the write request or receiving a write request from the host system 2 connected to the storage apparatus 4 (SP30). The CPU 60 waits for a write request to be received by the storage apparatus 4 while monitoring the write request of certain specified data (SP31).

When certain specified data is written in certain logical volumes VOL0 to VOLn from the host system 2 and the CPU 60 detects that this data is the writing of sample data stored in the verification table 620, the CPU 60 determines that it received a write request concerning specified data stored in the "specified data" field 620C of the verification table 620 (SP32). Then the CPU 60 refers to the verification table 620, and waits for the determination of the OS type only for the duration of the waiting time corresponding to the specified data while it is being written in the logical volumes VOL0 to VOLn (SP33).

Like this, the CPU 60 verifies the data written in the logical volumes VOL0 to VOLn against the sample data stored beforehand in the verification table 620 and determines whether the two data coincide (SP34).

When the CPU 60 determines that both data coincide (SP34: YES), it refers to the verification table 620 and determines the OS type. The CPU 60 thereby changes the OS type of the logical volumes VOL0 to VOLn written with certain specified data and updates the volume table 622 (SP35). In other words, the CPU 60 sets the OS type, which was set in the host system 2, in the "OS type" field 622B of the volume table 622.

Meanwhile, at step SP34, when the CPU 60 determines that both data do not coincide (SP34: NO), it determines this to be an OS type that is not pre-stored in the verification table 620, and determines that the OS type is "unknown" (SP36). Like this, the CPU 60 changes the OS type of the logical volumes VOL0 to VOLn written with specified data and updates the volume table 622 (SP35). In other words, the CPU 60 sets "unknown" in the "OS type" field 622B of the volume table 622, and sets "Boot" in the "volume type" field 622C. This is because, when the OS type is "unknown", it is safer in storing the data to handle this as a bootable logical volume of an unknown OS, and, as a result, it is possible to avoid setting errors and destruction of data.

When the CPU 60 once again returns to the state of monitoring the write request of certain specified data (SP37), it ends the OS type determination processing (SP38).

Accordingly, by performing the foregoing OS type determination processing, the CPU 60 is able to determine the OS type of data written in the logical volumes VOL0 to VOLn allocated to the host system 2.

The sequential routine of step SP31 to step SP35 of the OS type determination processing corresponds to the foregoing step SP10 to step SP15.

(1-3-3-2) Host Parameter Setting Processing

The processing routine of the CPU 60 upon setting the host parameter in the storage apparatus 4 is now explained.

Figure 16:
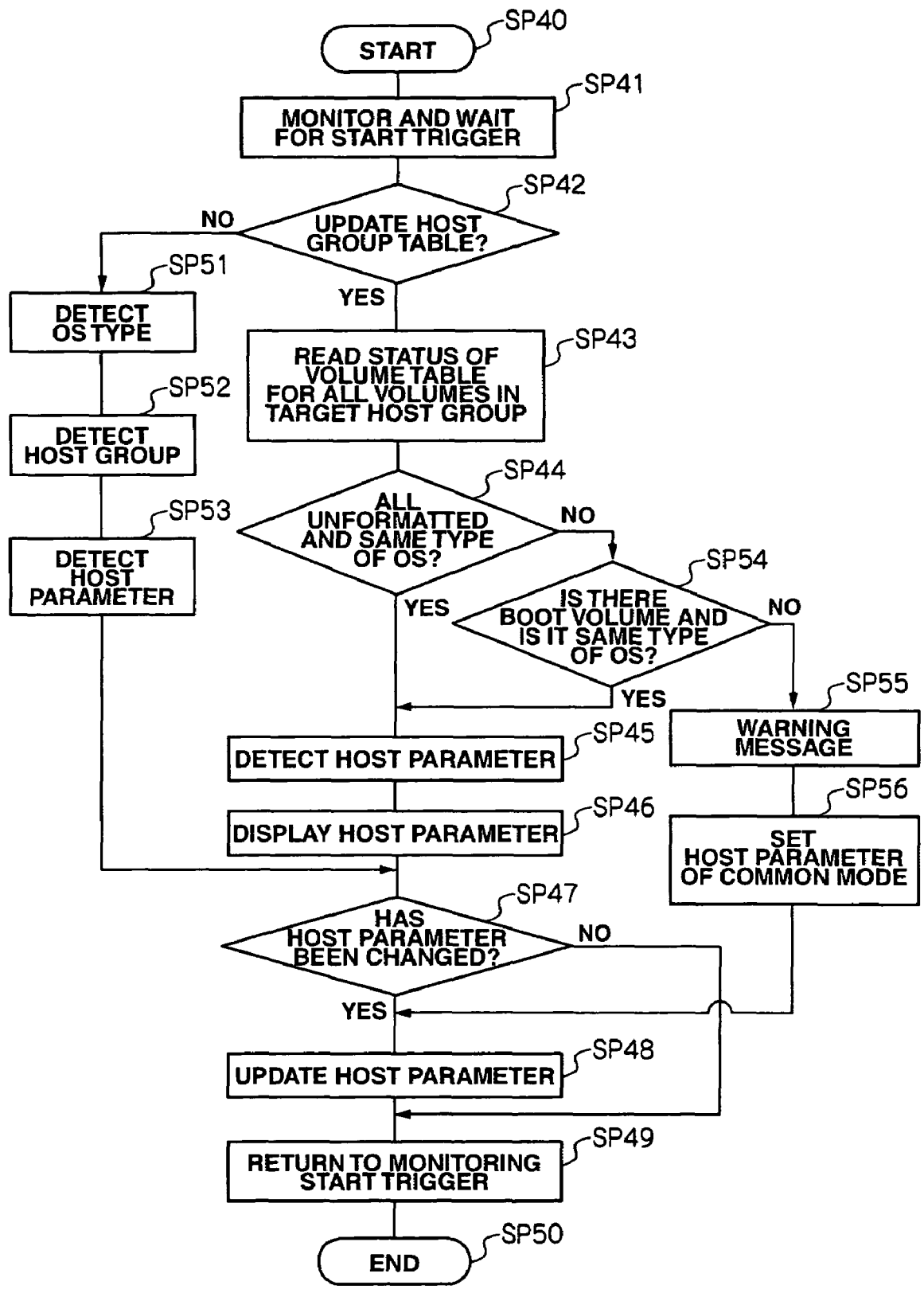
FIG. 16 is a flowchart of the host parameter setting processing according to an embodiment of the present invention.

FIG. 16 is a flowchart showing the processing contents of the CPU 60 concerning the host parameter setting processing. In this processing, the CPU 60 executes the host parameter setting processing based on the host parameter setting program 631 stored in the memory 61, and sets the host parameter based on the OS type of specified data written in the logical volumes VOL0 to VOLn.

The CPU 60 starts the host parameter setting processing when introducing the storage apparatus 4 or changing the OS type (SP40). In other words, the CPU 60 waits for the occurrence of a start trigger while constantly monitoring the start trigger (SP41). Here, a start trigger refers to the reference when the host parameter setting processing is started. Specifically, a start trigger is when the volume table 622 is updated, when the host group table 623 is newly created, or when the host group table 623 is updated.

Subsequently, the CPU 60 determines whether a start trigger occurred and the host group has been updated (SP42).

When the CPU 60 determines that the host group has been updated (SP42: YES), since this means that the OS type has been determined and the host group has been specified, it reads the status of the volume table 622 regarding all logical volumes allocated to the target host group (SP43).

Next, the CPU 60 determines whether the "OS type" field 622B of the volume table 622 is all "unformatted", and whether it is the same type of OS (SP44).

When the CPU 60 determines that the "OS type" field of the volume table is all "unformatted", and it is the same type of OS (SP44: YES), it refers to the host parameter table 621 from the determined same type of OS type, and detects the corresponding host parameter (SP45). Then the CPU 60 reports the detected result of the host parameter to the service processor 11, and displays such report on the display screen of the service processor 11 (SP46).

Figure 17:
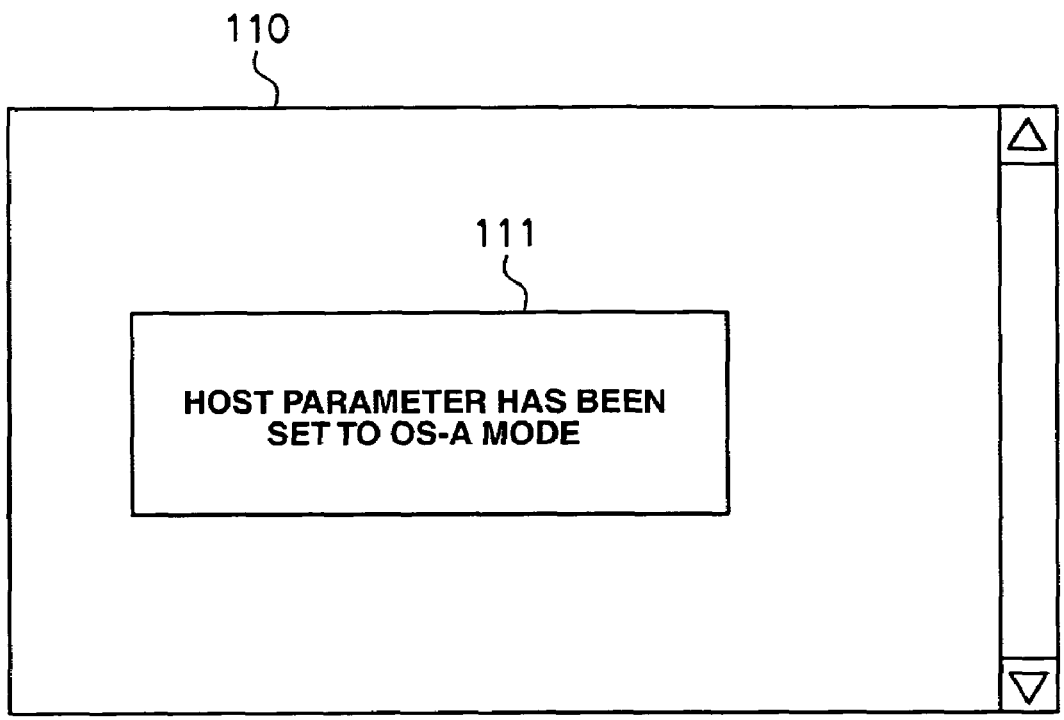
FIG. 17 is a display screen of a service processor for the host parameter setting according to an embodiment of the present invention.

Then the CPU 60 determines whether the host parameter has been changed (SP47). When the CPU 60 determines that the host parameter has been changed (SP47: YES), it sets and updates the host parameter of the host group table 623 (SP48). For example, as shown in FIG. 17, when the CPU 60 sets the host parameter, a set display 111 will be displayed on the display screen of the service processor 11. The CPU [60] then once again returns to monitoring the start trigger (SP49).

Meanwhile, at step SP47, when the CPU 60 determines that the host parameter has not been changed (SP47: NO), it does not change the host parameter of the host group table 623 and returns once again to monitoring the start trigger (SP49).

Thereby, the CPU 60 ends the host parameter setting processing (SP50).

Contrarily, at step SP42, when the CPU 60 determines that the host group has not been updated (SP42: NO), since this means that a request for formatting the logical volumes VOL0 to VOLn has been issued from the host system 2, it detects the OS type corresponding to the formatted logical volumes VOL0 to VOLn in the volume table 622 (SP51).

Then the CPU 60 refers to the host group table 623, and detects the formatted logical volumes VOL0 to VOLn and the host group to which the logical volumes VOL0 to VOLn belong (SP52). When the CPU 60 refers to the host parameter table 621 and detects the host parameter corresponding to the detected OS type (SP53), it proceeds to step SP47, and continues to perform the subsequent processing at step SP48 to step SP50.

Meanwhile, at step SP44, when the CPU 60 determines that the "OS type" field 622C of the volume table 622 is all "unformatted", and it is not the same type of OS (SP44: NO), it continues to determine whether there is a "Boot" logical volume, and whether it is the same type of OS (SP54).

At step SP54, when the CPU 60 determines that there is a "Boot" logical volume, and that it is the same type of OS (SP54: YES), it proceeds to step SP45, and continues to perform the subsequent processing at step SP46 to step SP50.

Figure 18:
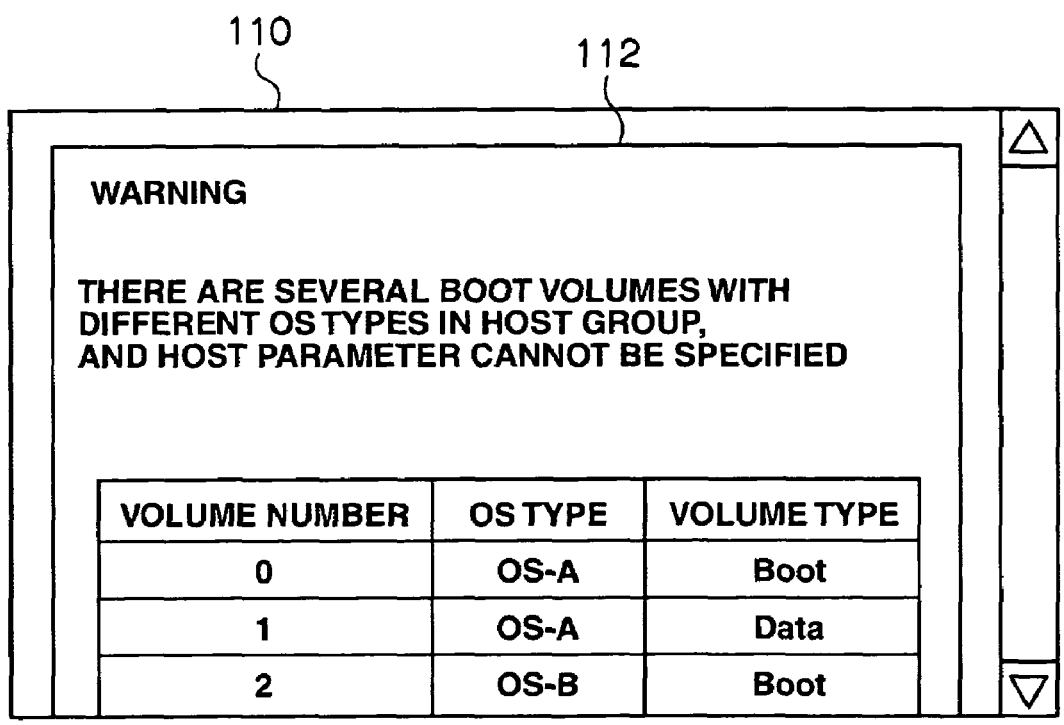
FIG. 18 is a display screen of a service processor for a warning message according to an embodiment of the present invention.

Contrarily, at step SP54, when the CPU 60 determines that there is no "Boot" logical volume, and that it is not the same type of OS (SP54: NO), it confirms that all target logical volumes are not "unformatted", and displays a warning message on the display screen 110 of the service processor 11 and the user's display screen (not shown) (SP55). This is because the CPU 60 determined that it is not possible to predict the OS type since there is no bootable logical volume, or that the risk of data destruction is high. For example, the CPU 60 will display a warning message 112 on the display screen 110 of the service processor 11 as shown in FIG. 18. This display screen is also shown to the user. According to this example, since a "Boot" logical volume allocated with different OS types exists in the logical volumes VOL0 and the logical volume VOL2 in the same host group, the display shows that the CPU 60 is not able to specify the host parameter.

Thereafter, when the CPU 60 sets the host parameter of the host group table 623 to the "common mode", it proceeds to step SP48, and continues to perform the subsequent processing at step SP49 and step SP50.

Like this, by performing the host parameter setting processing, the CPU 60 is able to set the host parameter of the logical volumes VOL0 to VOLn allocated to the host system 2.

The sequential routine at step SP40 to step SP44 and step SP54 to step SP56 of the host parameter setting processing corresponds to step SP0 to step SP8 described above. Further, the sequential routine at step SP42, step SP51 to step SP53 and step SP47 to step SP49 of the host parameter setting processing corresponds to step SP16 to step SP22 described above.

(1-3-3-3) Application of Host Parameter Setting Processing

Application of the processing routine of the CPU 60 upon setting the host parameter is now explained. In the following explanation, only the processing that is different from the processing performed by the CPU 60 concerning the foregoing host parameter setting processing will be described. Incidentally, the processing contents that are the same as those in the flowchart shown in FIG. 16 are indicated with the same step number.

Figure 19:
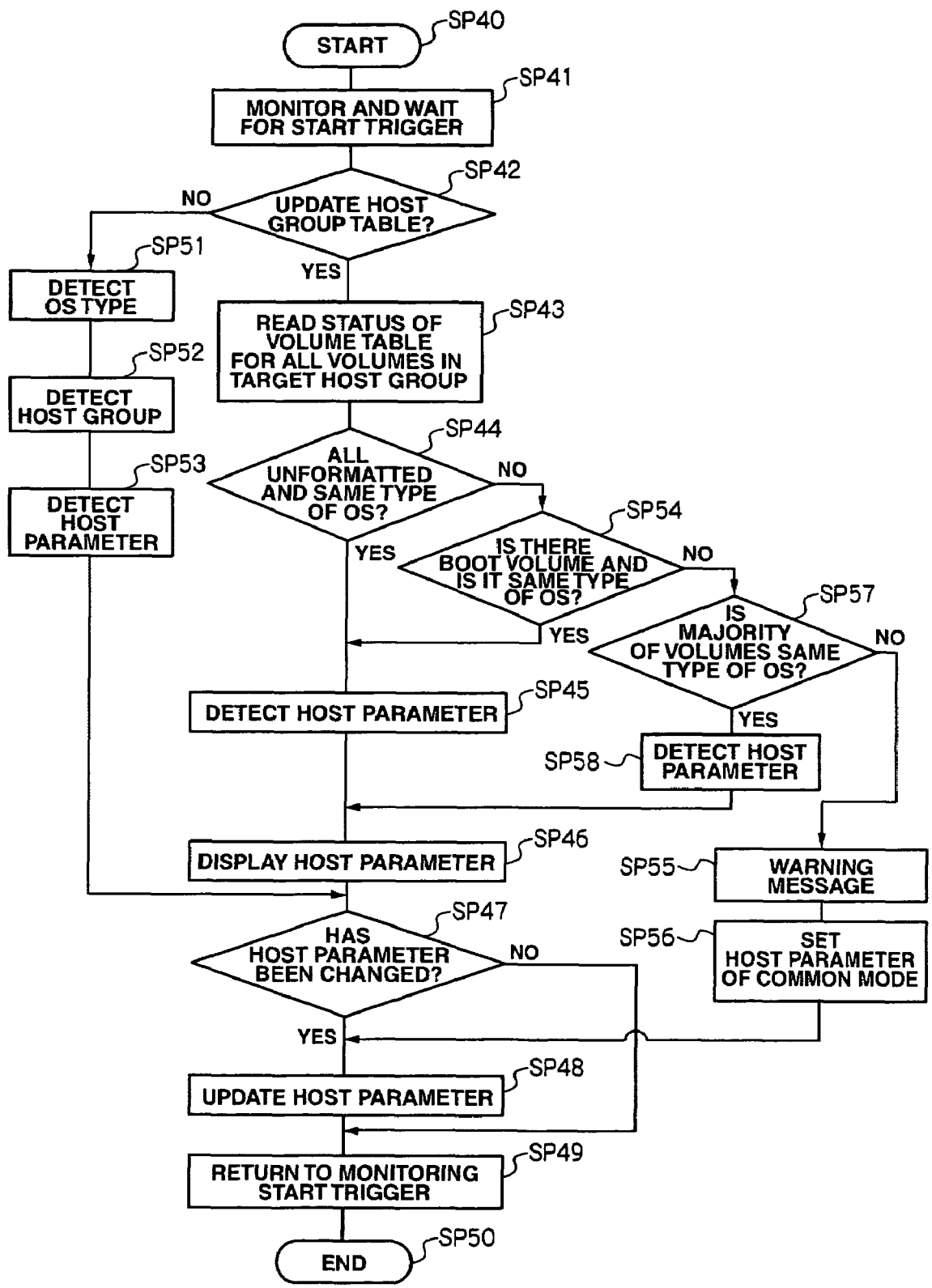
FIG. 19 is a flowchart of an application of the host parameter setting processing according to an embodiment of the present invention.

FIG. 19 is a flowchart showing the processing contents of the CPU 60 concerning the application of the host parameter setting processing. In this processing also, the CPU 60 executes the host parameter setting processing based on the host parameter setting program 631 stored in the memory 61, and sets the host parameter based on the OS type of specified data written in the logical volumes VOL0 to VOLn.

At step SP54, when the CPU 60 determines that there is a "Boot" logical volume, and that it is the same type of OS (SP54: YES), it continues to determine whether the majority of the logical volumes VOL0 to VOLn are the same type of OS (SP57).

When the CPU 60 determines that the majority of the logical volumes are the same type of OS (SP57: YES), it detects the host parameter corresponding to the same type of OS (SP58), proceeds to step SP46, and continues to perform the subsequent processing at step SP47 to step SP50.

Meanwhile, at step SP57, when the CPU 60 determines that the majority of the logical volumes are not the same type of OS (SP57: NO), it proceeds to step SP55, and, via the subsequent processing step SP56, performs step SP48 to step SP50.

As described above, according to the processing contents of the CPU 60 concerning the application of the host parameter setting processing, it is possible to set the host parameter even in cases when partially sharing the logical volumes VOL0 to VOLn in the respective host systems having different OS types.

(1-4) Effect of First Embodiment

According to the present embodiment, since the system administrator or the like is able to allocate the logical volumes VOL0 to VOLn to the same OS type and set the host parameter setting in the storage apparatus 4 simply by connecting the host system 2 and the storage apparatus 4 having different OS types, it is possible to reliably avoid a setting error and alleviate the management burden of system administrators or the like. Further, the system administrator or the like will be able to easily connect the host system 2 and the storage apparatus 4, and prevent the destruction of data due to an erroneous connection.

As a result of the CPU 60 referring to the verification table 620 and the host parameter 621 pre-stored in the storage apparatus 4, it is able to detect the OS type of specified data written in the logical volumes VOL0 to VOLn. Thereby, the CPU 60 is able to set the host parameter based on the detected OS type.

Further, with respect to the OS type that cannot be recognized by the CPU 60, since a common mode that does hot cause a malfunction between the host system 2 and the storage apparatus 4 or inconveniences such as data destruction is set, this is compatible to OS types to be upgraded in the near future.

(2) Second Embodiment

The storage system 100 according to the second embodiment is now explained.

Regarding the storage system 100 according to the second embodiment, the points that are different from the storage system 1 according to the first embodiment will be explained.

Foremost, the configuration of the storage system 100 according to the second embodiment is the same as the configuration of the storage system 1 according to the first embodiment excluding the internal configuration of the channel adapter 600 having the host parameter setting function, and the explanation thereof is omitted.

(2-1) Host Parameter Setting Function

The host parameter setting function loaded in the storage system 100 according to this embodiment is now explained.

As with the storage system 1 of the first embodiment, the storage system 100 is characterized in that the storage apparatus 4 determines the type of OS (hereinafter referred to as the "OS type") loaded in the host system 2, and the storage apparatus 4 sets the operation parameter of the host system 2 in the storage apparatus 4 according to the OS type. The specific configuration of the storage apparatus 4 for realizing the foregoing characteristic is now explained.

Figure 20:
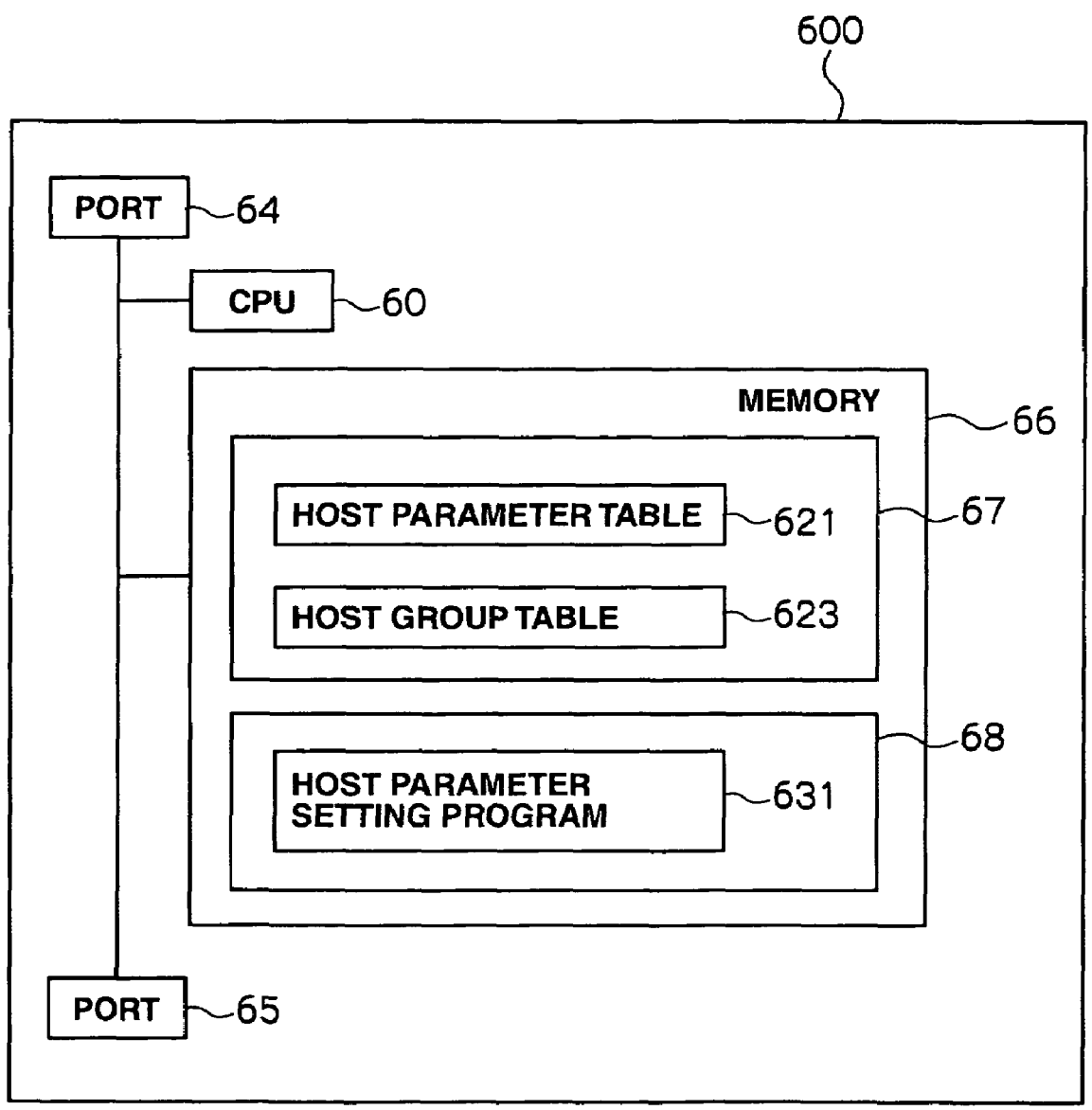
FIG. 20 is a block diagram showing the internal configuration of a channel adapter according to another embodiment of the present invention.

As shown in FIG. 20, the channel adapter 600 has a CPU 60 and a memory 66.

The memory 66, for instance, is used as a work area of the CPU 60, and stores a management table group 67 and a control program 68.

Specifically, the management table group 67 stores the host parameter table 621 and the host group table 623. Contents of the various management tables 62 are the same as those of the first embodiment, and the explanation thereof is omitted.

The control program 68 stores a host parameter setting program 631.

(2-2) Host Parameter Setting Processing

The processing routine of the CPU 60 upon setting the host parameter in the storage apparatus 4 is now explained.

Figure 21:
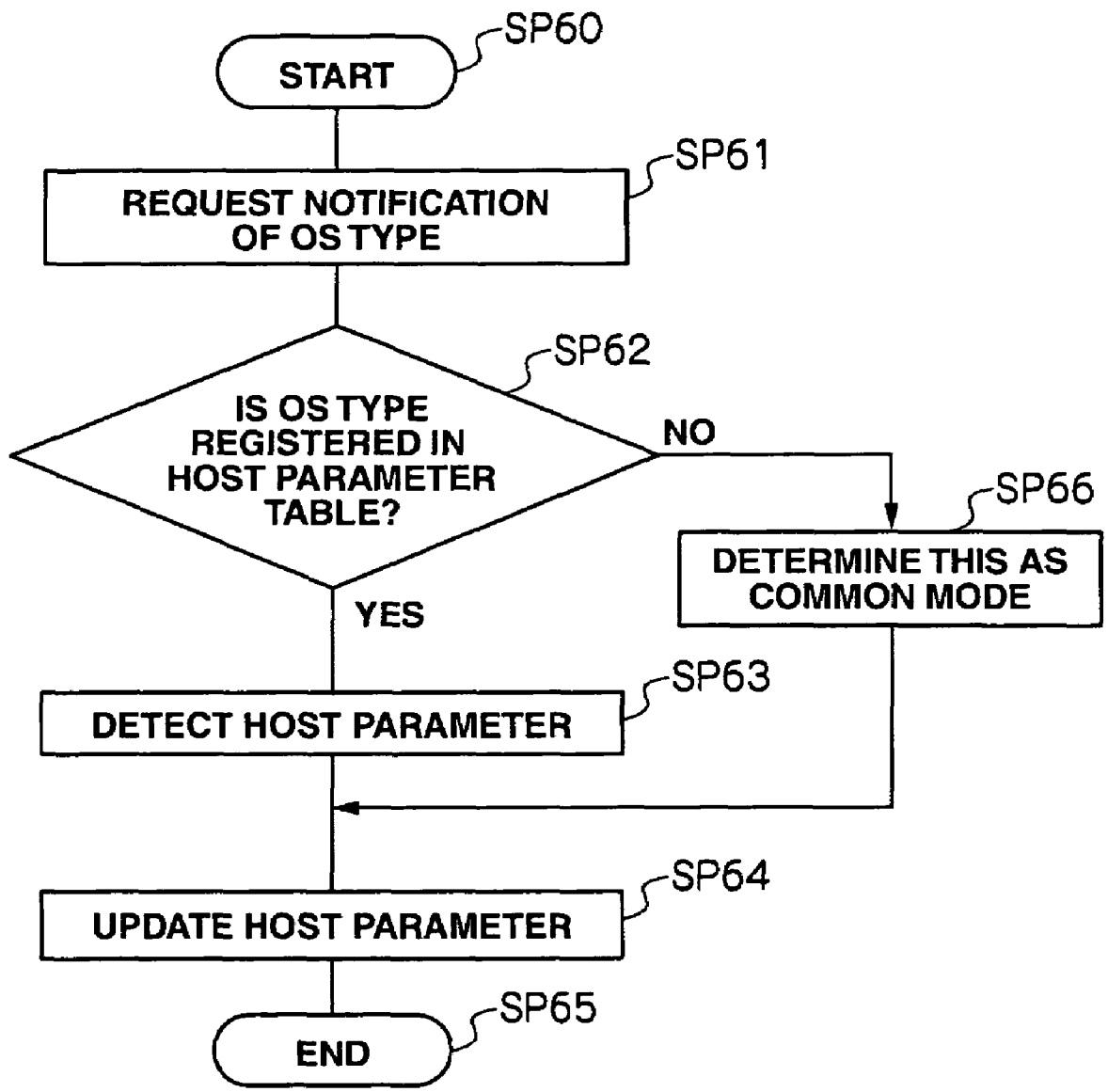
FIG. 21 is a flowchart of the host parameter setting processing according to another embodiment of the present invention.

FIG. 21 is a flowchart showing the processing contents of the CPU 60 concerning the host parameter setting processing. In this processing, the CPU 60 of the storage apparatus 4 requests the OS type to the host system 2, and executes the host parameter setting processing based on the host parameter setting program 631 stored in the memory 66, and sets the host parameter based on the OS type.

The CPU 60 starts the host parameter setting processing when the storage apparatus 4 is introduced or data is written in the logical volumes VOL0 to VOLn (SP60).

Then the CPU 60 requests the host system 2 to notify the OS type (SP61).

Subsequently, when the CPU 60 receives the notification of the OS type from the host system 2, it determines whether the OS type is registered in the host parameter (SP62).

When the CPU 60 determines that the OS type is registered in the host parameter (SP62: YES), it refers to the host parameter table 621, and detects the host parameter corresponding to the OS type (SP63).

Then the CPU 60 refers to the host group table 623, sets the "host parameter" field 623C corresponding to the host group that sent the notification of the OS type as the detected host parameter, and updates the host group table 623 (SP64).

Thereby, the CPU 60 ends the host parameter setting processing (SP65).

Meanwhile, at step SP62, when the CPU 60 determines that the OS type is not registered in the host parameter (SP62: NO), it determines the OS type to be "unknown" and determines the host parameter field 623C of the host group table 623 to be a "common mode" (SP66). Then the CPU 60 refers to the host group table 623, sets the "host parameter" field 623C corresponding to the host group that sent the notification of the OS type to the "common mode" as the determined host parameter, updates the host group table 623 (SP64), and ends the host parameter setting processing (SP65).

(2-3) Effect of Second Embodiment

According to the present embodiment, the system administrator or the like is able to allocate the logical volumes VOL0 to VOLn to the same OS type and set the host parameter setting in the storage apparatus 4 simply by connecting the host system 2 and the storage apparatus 4 having different OS types, it is possible to reliably avoid a setting error and alleviate the management burden of system administrators or the like. Further, the system administrator or the like will be able to easily connect the host system 2 and the storage apparatus 4, and prevent the destruction of data due to an erroneous connection.

Further, when the response means is unified between the host system 2 and the storage apparatus 4, by directly requesting the notification of the OS type from the storage apparatus 4 to the host system 2, it is possible to set the host parameter in the storage apparatus without having to detect the OS type.

Moreover, with respect to the OS type that cannot be recognized by the CPU 60, since a common mode that does not cause a malfunction between the host system 2 and the storage apparatus 4 or inconveniences such as data destruction is set, this is compatible to OS types to be upgraded in the near future.

(3) Other Embodiments

In the first embodiment, a storage system having one or more host systems, and a storage control unit for providing a data logical volume configured from a storage extent for reading and writing data from and in each of the host systems made a determination unit for determining the type of operation system loaded in the host system based on the type information of the operation system sent from the host system according to a command sent from the host system or a request of the storage control unit perform step SP10 to step SP15, and a parameter setting unit for setting a prescribed operation parameter of the host system according to the operation system determined with the determination unit perform step SP16 to step SP23. Nevertheless, the present invention is not limited thereto, and the determination unit and the setting unit may be respectively configured from separate hardware.

The present invention can be broadly applied to a storage system having one or more storage apparatuses, or to storage systems of other modes.

We claim:

1. A storage system having one or more host systems, and a storage control unit for providing a data logical volume configured from a storage extent for reading and writing data from and in each of said host systems, wherein said storage control unit comprises:

a determination unit for determining the type of operation system loaded in said host system based on the type information of the operation system sent from said host system according to a command sent from said host system or a request of said storage control unit; and a parameter setting unit for setting a prescribed operation parameter of said host system according to said operation system determined with said determination unit, wherein said determination unit determines the type of operation system loaded in said host system by verifying said data from said host system against sample data store in said storage control unit.

2. The storage system according to claim 1, wherein said storage control unit has, in addition to said data logical volume, a bootable logical volume for storing the operation system loaded in said host system; and wherein said determination unit determines the type of operation system loaded in said host system based on the type of operation system stored in said bootable logical volume.

3. A storage system having one or more host systems, and a storage control unit for providing a data logical volume configured from a storage extent for reading and writing data from and in each of said host systems, wherein said storage control unit comprises:

a determination unit for determining the type of operation system loaded in said host system based on the type information of the operation system sent from said host system according to a command sent from said host system or a request of said storage control unit; and a parameter setting unit for setting a prescribed operation parameter of said host system according to said operation system determined with said determination unit, wherein said setting unit verifies said data from said host system against sample data store in said storage control unit, and sets a prescribed operation parameter common to all operation systems when said data does not coincide with said sample data.

4. The storage system according to claim 3, wherein said storage control unit has, in addition to said data logical volume, a bootable logical volume for storing the operation system loaded in said host system; and wherein said determination unit determines the type of operation system loaded in said host system based on the type of operation system stored in said bootable logical volume.

5. A data management setting method of a storage system having one or more host systems, and a storage control unit for providing a data logical volume configured from a storage extent for reading and writing data from and in each of said host systems, wherein said data management setting method comprises:

a determination step for determining the type of operation system loaded in said host system based on the type information of the operation system sent from said host system according to a command sent from said host system or a request of said storage control unit; and a parameter setting step for setting a prescribed operation parameter of said host system according to said operation system determined at said determination step, wherein at said determination step, the type of operation system loaded in said host system is determined by verifying said data from said host system against sample data store in said storage control unit.

6. The data management setting method according to claim 5, wherein said storage control unit has, in addition to said data logical volume, a bootable logical volume for storing the operation system loaded in said host system; and, at said determination step, the type of operation system loaded in said host system is determined based on the type of operation system stored in said bootable logical volume.

7. A data management setting method of a storage system having one or more host systems, and a storage control unit for providing a data logical volume configured from a storage extent for reading and writing data from and in each of said host systems, wherein said data management setting method comprises:
- a determination step for determining the type of operation system loaded in said host system based on the type information of the operation system sent from said host system according to a command sent from said host system or a request of said storage control unit; and
- a parameter setting step for setting a prescribed operation parameter of said host system according to said operation system determined at said determination step, wherein at said setting step, said data from said host system is verified against sample data store in said storage control unit, and a prescribed operation parameter common to all operation systems is set when said data does not coincide with said sample data.

8. The data management setting method according to claim 7, wherein said storage control unit has, in addition to said data logical volume, a bootable logical volume for storing the operation system loaded in said host system; and, at said determination step, the type of operation system loaded in said host system is determined based on the type of operation system stored in said bootable logical volume.

* * * * *

UNITED STATES PATENT AND TRADEMARK OFFICE
CERTIFICATE OF CORRECTION

PATENT NO. : 7,634,647 B2  Page 1 of 1
APPLICATION NO. : 11/524879
DATED : December 15, 2009
INVENTOR(S) : Tanaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this

Ninth Day of November, 2010

David J. Kappos
*Director of the United States Patent and Trademark Office*